United States Patent
Miyazaki

(10) Patent No.: US 12,067,304 B2
(45) Date of Patent: Aug. 20, 2024

(54) IMAGE PROCESSING APPARATUS, IMAGE PROCESSING METHOD, AND NON-TRANSITORY COMPUTER-READABLE STORAGE MEDIUM STORING A PROGRAM THAT PERFORMS DYNAMIC RANGE CONVERSION BASED ON OBTAINED DISPLAY INFORMATION

(71) Applicant: CANON KABUSHIKI KAISHA, Tokyo (JP)

(72) Inventor: Shinichi Miyazaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/161,862

(22) Filed: Jan. 29, 2021

(65) Prior Publication Data
US 2021/0241055 A1 Aug. 5, 2021

(30) Foreign Application Priority Data
Jan. 31, 2020 (JP) ................................. 2020-015535

(51) Int. Cl.
*H04N 1/60* (2006.01)
*G06F 3/12* (2006.01)
(Continued)

(52) U.S. Cl.
CPC .............. *G06F 3/1208* (2013.01); *G06T 3/00* (2013.01); *G06T 5/92* (2024.01); *H04N 1/6027* (2013.01);
(Continued)

(58) Field of Classification Search
CPC ............................ G06F 3/1208; G06K 15/188
See application file for complete search history.

(56) References Cited

U.S. PATENT DOCUMENTS 5,012,333 A * 4/1991 Lee ........................... H04N 1/58
358/520
7,783,121 B1 8/2010 Cox
(Continued)

FOREIGN PATENT DOCUMENTS

CN 104717432 A 6/2015
CN 105469375 A 4/2016
(Continued)

OTHER PUBLICATIONS

Kudo et al., Color restoration of lighting scenes with locally adapted HDR images, 2015 (Year: 2015).*
(Continued)

*Primary Examiner* — Barbara D Reinier
(74) *Attorney, Agent, or Firm* — Venable LLP

(57) ABSTRACT

An image processing apparatus includes a first obtainment unit configured to obtain high dynamic range (HDR) data that represents a high-dynamic range (HDR) image, a second obtainment unit configured to obtain print information to perform printing based on the HDR data obtained by the first obtainment unit, a third obtainment unit configured to obtain display information of a display apparatus that is to perform a display based on the HDR data, and a conversion unit configured to perform dynamic range conversion based on the display information obtained by the third obtainment unit, and then to perform dynamic range conversion based on the print information obtained by the second obtainment unit.

16 Claims, 9 Drawing Sheets

(51) Int. Cl.
  *G06T 3/00* (2006.01)
  *G06T 5/92* (2024.01)
  *G06K 15/02* (2006.01)
(52) U.S. Cl.
  CPC ......... *H04N 1/6072* (2013.01); *H04N 1/6097* (2013.01); *G06K 15/188* (2013.01); *G06T 2207/20208* (2013.01)

(56) References Cited

U.S. PATENT DOCUMENTS

| | | | |
|---|---|---|---|
| 8,259,373 B2 * | 9/2012 | Jung | H04N 1/6011 358/1.9 |
| 9,883,112 B1 | 1/2018 | Igor' Valer'Evich | |
| 10,678,159 B2 * | 6/2020 | Wada | G03G 15/043 |
| 10,848,644 B2 | 11/2020 | Suwa | |
| 11,146,738 B2 | 10/2021 | Kagawa et al. | |
| 11,182,883 B2 * | 11/2021 | Kagawa | H04N 1/58 |
| 11,514,562 B2 * | 11/2022 | Suwa | G06T 7/571 |
| 2004/0205640 A1 * | 10/2004 | Laughlin | G06F 3/1256 715/274 |
| 2004/0264799 A1 | 12/2004 | Gallagher | |
| 2005/0254722 A1 | 11/2005 | Fattal | |
| 2007/0009167 A1 | 1/2007 | Dance | |
| 2008/0131016 A1 | 6/2008 | Kokemohr | |
| 2008/0310501 A1 | 12/2008 | Ward et al. | |
| 2009/0041376 A1 | 2/2009 | Carletta | |
| 2010/0053376 A1 | 3/2010 | Fukuda | |
| 2011/0273731 A1 * | 11/2011 | Haikin | G06F 3/012 358/1.9 |
| 2012/0236020 A1 | 9/2012 | Paris | |
| 2014/0140615 A1 | 5/2014 | Finlayson | |
| 2015/0170389 A1 | 6/2015 | Ming | |
| 2016/0358346 A1 * | 12/2016 | Hendry | H04N 1/6061 |
| 2017/0330312 A1 | 11/2017 | Nam | |
| 2018/0270489 A1 | 9/2018 | Maymon | |
| 2019/0246087 A1 | 8/2019 | Uesaka et al. | |
| 2019/0303733 A1 * | 10/2019 | Kozuka | H04N 5/232 |
| 2019/0364171 A1 | 11/2019 | Suwa et al. | |
| 2020/0007695 A1 | 1/2020 | Kagawa | |
| 2020/0007712 A1 | 1/2020 | Ogawa et al. | |
| 2020/0007717 A1 | 1/2020 | Suwa et al. | |
| 2020/0007734 A1 | 1/2020 | Kagawa | |
| 2020/0013149 A1 | 1/2020 | Yazawa | |
| 2020/0013150 A1 | 1/2020 | Kagawa et al. | |
| 2020/0068161 A1 * | 2/2020 | Zhang | H04N 5/20 |
| 2020/0090313 A1 | 3/2020 | Bugdary | |
| 2020/0272374 A1 | 8/2020 | Kawai et al. | |
| 2020/0288051 A1 | 9/2020 | Suwa | |
| 2020/0302659 A1 | 9/2020 | Urabe et al. | |
| 2021/0021715 A1 | 1/2021 | Sato | |
| 2021/0241056 A1 * | 8/2021 | Miyazaki | G09G 5/10 |

FOREIGN PATENT DOCUMENTS

| | | |
|---|---|---|
| CN | 109983754 A | 7/2019 |
| CN | 110661931 A | 1/2020 |
| CN | 113276570 A | 8/2021 |
| EP | 1742178 A2 | 1/2007 |
| EP | 3544280 A1 | 9/2019 |
| EP | 3588930 A1 | 1/2020 |
| JP | 2002016816 A | 1/2002 |
| JP | 2011097366 A * | 5/2011 |
| JP | 2019080156 A | 5/2019 |
| JP | 2020004268 A | 1/2020 |
| WO | 2018092711 A1 | 5/2018 |

OTHER PUBLICATIONS

European Search Report mailed Jun. 30, 2021, issued in corresponding European Application No. 21154213.9.
Japanese Office Action issued on Sep. 8, 2023, in corresponding Japanese Patent Application No. 2020-015535, with English Translation (10 pages).
Office Action issued on Nov. 28, 2023, in corresponding Chinese Application No. 202110135015.9, with machine English translation (20 pages).
European Patent Office Communication pursuant to Article 94(3) issued Feb. 13, 2024, in corresponding European patent application No. 21154213.9 (5 pages).

* cited by examiner

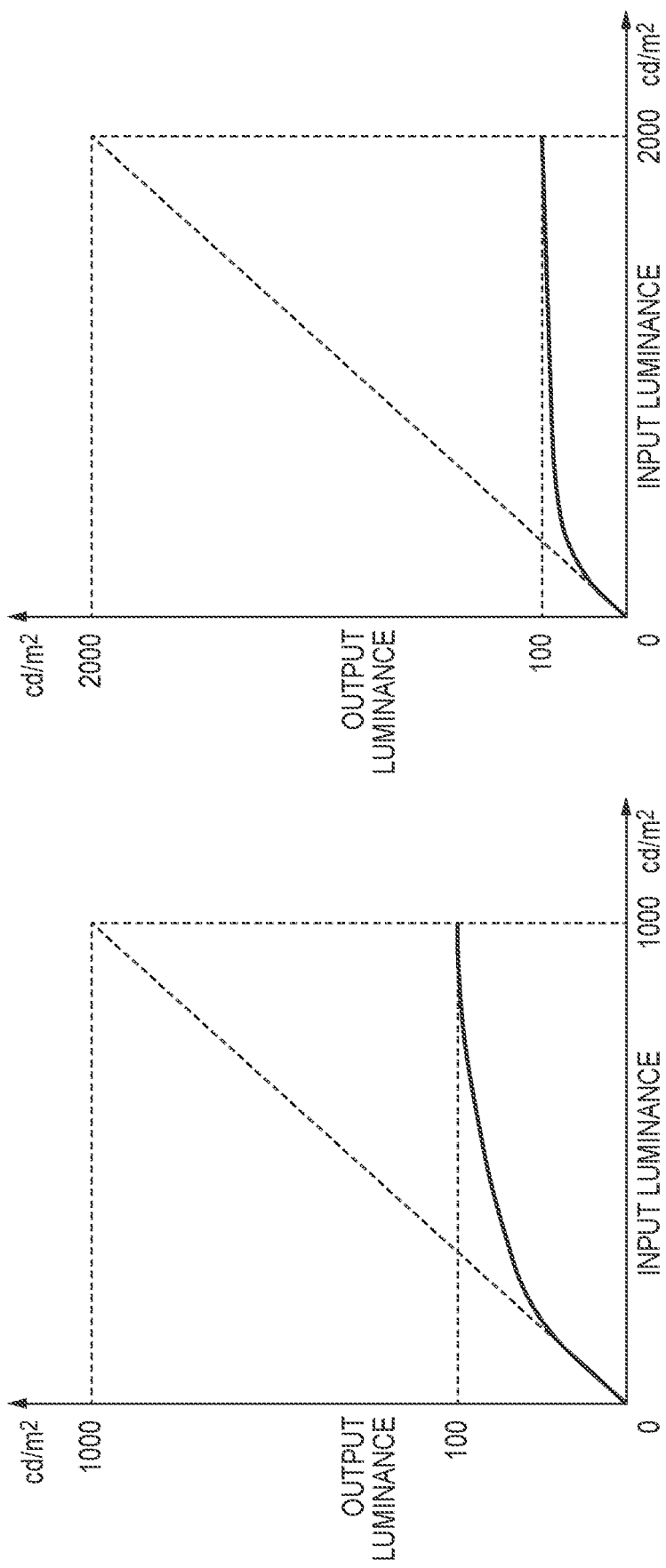

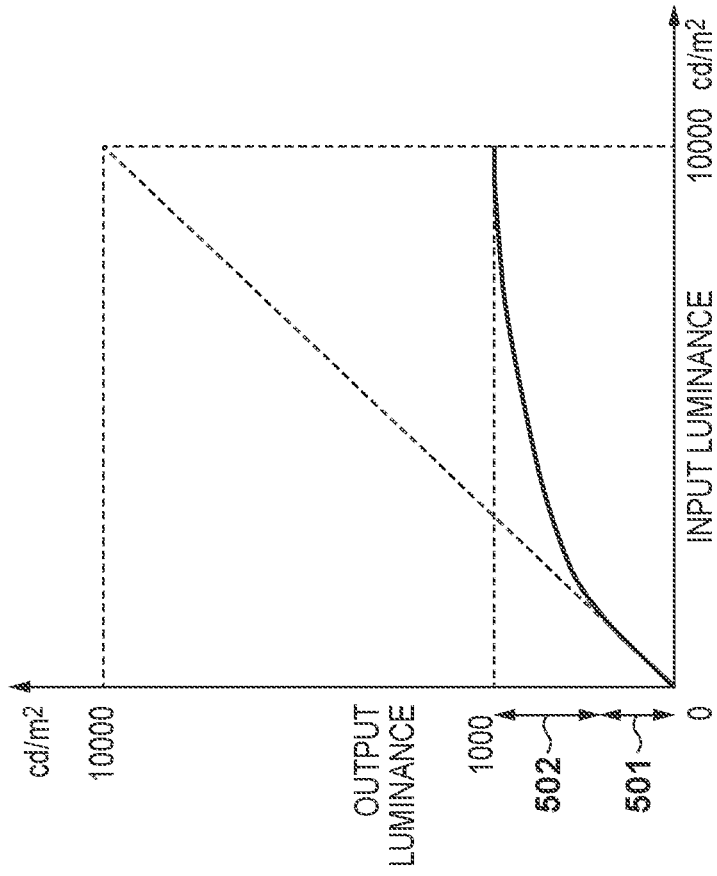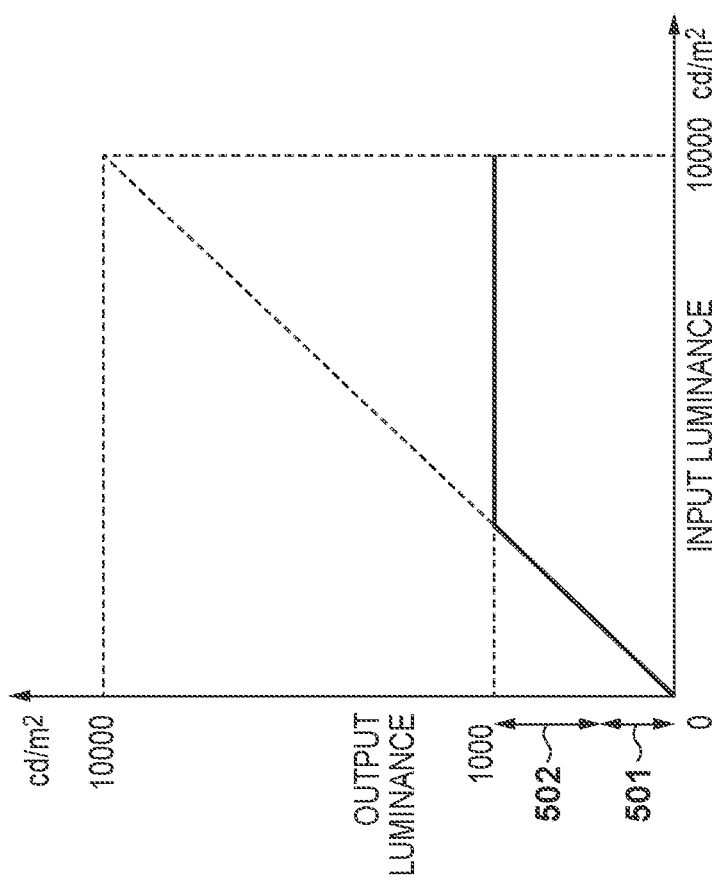

IMAGE PROCESSING APPARATUS, IMAGE PROCESSING METHOD, AND NON-TRANSITORY COMPUTER-READABLE STORAGE MEDIUM STORING A PROGRAM THAT PERFORMS DYNAMIC RANGE CONVERSION BASED ON OBTAINED DISPLAY INFORMATION

This application claims the benefit of Japanese Patent Application No. 2020-015535, filed Jan. 31, 2020, which is hereby incorporated by reference herein in its entirety.

BACKGROUND OF THE INVENTION

Field of the Invention

The present invention relates to an image processing apparatus that can process high dynamic range data, an image processing method, a non-transitory computer-readable storage medium storing a program.

Description of the Related Art

International Publication No. 2018/092711 discloses that the luminance dynamic range of the HDR data of a high dynamic range (HDR) still image is converted into still image data that has a narrower dynamic range that is determined by the reflection luminance of a print sheet. HDR data is used as image capturing data of a moving image, a still image, and the like. Recently, the maximum luminance that can be displayed in a display that displays HDR data has improved, and the HDR data from the highlight side to the shadow side of an image can be displayed simultaneously with high image quality.

For example, in Recommendation ITU-R (International Telecommunication Union Radiocommunication Sector) BT.2100-2 (07/2018), image parameter values for high dynamic range television for use in production and international programme exchange, Hybrid Log Gamma (HLG) and Perceptual Quantization (PQ) are defined as two image transfer functions of HDR data. In a transfer function, the transfer function and a bit count are defined so the tonal discontinuity will not be visually detected in image transfer.

An imaging method is defined by an OETF (Opto-Electronic Transfer Function) of the image capturing side, an EOTF (Electro-Optical Transfer Function) of the display side, and an OOTF (Opto-Optical Transfer Function) that represents the overall characteristic of conversion from scene light to display light.

An HLG method is a method that defines the OETF of the image capturing side described above by handling the range of black to white as relative tones. The EOTF of the display side is formed by an inverse function of the OETF and the OOTF, which represents the overall characteristic of conversion from scene light to display light. In the HLG method, system gamma that determines the characteristic of the OOTF is applied only on a luminance component. In addition, the system gamma is determined in accordance with the luminance of each display by considering how image quality changes between displays with different maximum displayable luminance values. Also, the PQ method is a method that defines the EOTF of the display side described above by representing the display-side luminance by an absolute value of maximum 10,000 cd/m$^2$. The OETF of the image capturing side is formed by the OOTF and an inverse function of the EOTF.

On the other hand, the dynamic range of a print output tends to be narrower than the dynamic range of HDR data. In recent years, SDR (Standard Dynamic Range) displays were mainstream until the appearance of HDR displays with wide display luminance ranges. Conventionally, the maximum luminance value used when SDR data is to be displayed on a display is normally considered to be fixed at 100 cd/m$^2$. In contrast, the maximum value of luminance used when HDR data is to be displayed on a display can be changed in accordance with the luminance value defined by the HDR data or the maximum luminance value of the HDR display.

SUMMARY OF THE INVENTION

The present invention provides an image processing apparatus that allows a print output corresponding to display information of a display apparatus, an image processing method, and a non-transitory computer-readable storage medium storing a program.

The present invention in its first aspect provides an image processing apparatus comprising a first obtainment unit configured to obtain HDR data that represents a high-dynamic range (HDR) image, a second obtainment unit configured to obtain print information to perform printing based on the HDR data obtained by the first obtainment unit, a third obtainment unit configured to obtain display information of a display apparatus that is to perform display based on the HDR data, and a conversion unit configured to convert, based on the display information obtained by the third obtainment unit, a dynamic range of luminance of the HDR data obtained by the first obtainment unit into a dynamic range by which printing is to be performed based on the print information obtained by the second obtainment unit.

The present invention in its second aspect provides an image processing method to be executed in an image processing apparatus, the method comprising obtaining HDR data that represents a high-dynamic range (HDR) image, obtaining print information to perform printing based on the obtained HDR data; obtaining display information of a display apparatus that is to perform display based on the HDR data, and converting, based on the obtained display information, a dynamic range of luminance of the obtained HDR data into a dynamic range by which printing is to be performed based on the obtained print information.

The present invention in its third aspect provides a non-transitory computer-readable storage medium storing a program to cause a computer to function to obtain HDR data that represents a high-dynamic range (HDR) image, to obtain print information to perform printing based on the obtained HDR data to obtain display information of a display apparatus that is to perform display based on the HDR data; and convert, based on the obtained display information, a dynamic range of luminance of the obtained HDR data into a dynamic range by which printing is to be performed based on the obtained print information.

According to the present invention, a print output corresponding to display information of a display apparatus can be performed.

Further features of the present invention will become apparent from the following description of exemplary embodiments with reference to the attached drawings.

BRIEF DESCRIPTION OF THE DRAWINGS

FIGS. 4A and 4B are graphs each showing a conversion curve;

FIGS. 5A and 5B are graphs each showing a conversion curve;

DESCRIPTION OF THE EMBODIMENTS

Figure 1:
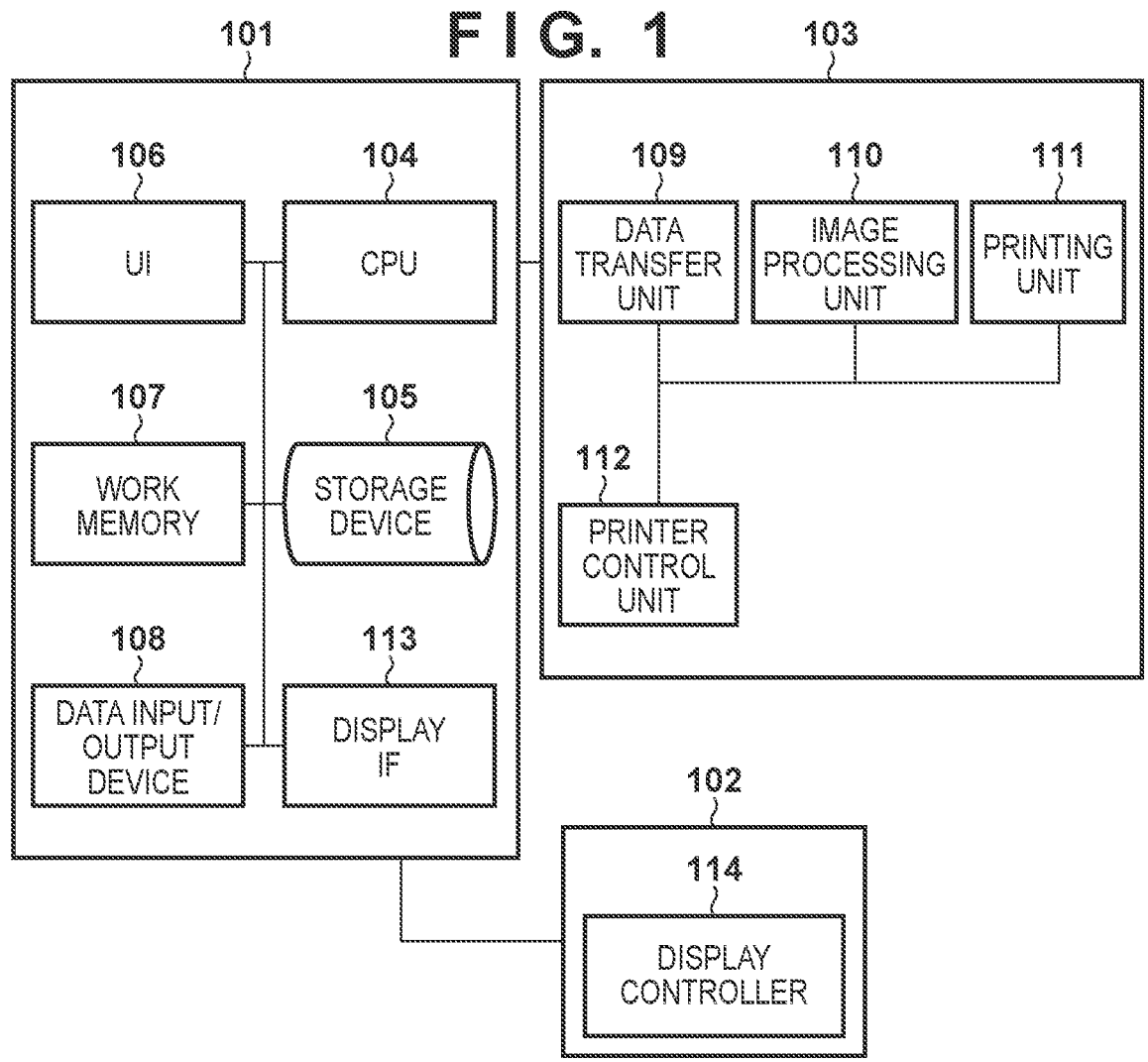
FIG. 1 is a block diagram showing the overall arrangement of a print system.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In a case in which the above-described HDR data is of the HLG method, it will be data whose tone is defined based on a relative luminance value. Hence, when the data is to be displayed on a plurality of displays, the luminance of an image to be displayed will change in accordance with the maximum luminance value of each display as described above. In the case of the PQ method, the data is defined by an absolute luminance value. Hence, when the data is to be displayed on a plurality of displays, the luminance of an image to be displayed will be the same in each display with respect to a luminance range that can be commonly reproduced among the displays. However, with respect to the luminance range of a highlight, or the like, which cannot be commonly reproduced among the displays, the luminance of an image to be displayed will change in accordance with the maximum luminance display of each display. Display will be performed faithfully to the data in a case in which the luminance dynamic range of the data and the displayable luminance range of the display are the same. On the other hand, in a display with a narrow luminance range with respect to the data, a highlight portion that cannot be displayed will be, for example, completely displayed in white at a maximum luminance value. On the other hand, in a case in which HDR data is input to a printing apparatus, the HDR data will be output as a uniform printed product that is in a one-to-one correspondence with data converted to have a printable dynamic range as in International Publication No. 2018/092711.

In this manner, although display apparatuses will adaptively change the display of the same HDR data in accordance with a condition such as the maximum luminance value, or the like, a printing apparatus will be required to output the HDR data corresponding to the display apparatuses. Hence, even though displays (display apparatuses) that have different maximum luminance values are present recently, a print output corresponding to the display of each display cannot be obtained by a printing apparatus.

According to one point of view of the present invention, a print output corresponding to the display information of a display apparatus can be obtained.

First Embodiment

System Arrangement

FIG. 1 is a block diagram showing the overall arrangement of a print system in which an image processing apparatus has been applied according to this embodiment. This pint system includes personal computer apparatus (information processing apparatus) 101 (to be also referred to as a "PC" hereafter), a display apparatus 102, and a output apparatus 103.

The display apparatus 102 is connected to the PC 101 via a display I/F. The display apparatus 102 is an HDR (High Dynamic Range) display and is connected to the PC 101 by an HDMI interface. The connection between the PC 101 and the display apparatus 102 is not limited to the HDMI interface and may be of another connection method as long as it is in compliance with a standard that can transfer HDR (High Dynamic Range) data. Also, the display information (to be described later) transferred between the PC 101 and the display apparatus 102 may be transferred via a display I/F 113 by using a USB (Universal Serial Bus) of a transfer path different from the HDMI interface. However, the display information transfer method is not limited to the USB cable as long as information can be communicated bidirectionally between the display apparatus 102 and the PC 101 or the output apparatus 103.

In addition, the output apparatus 103 is connected to the PC 101 via an interface such as a network, a USB cable, or a local bus. In this embodiment, an arrangement that uses an inkjet printer (image processing apparatus) will be described as an example of the output apparatus 103. The PC 101 performs operations such as issuing a print control instruction to the output apparatus 103, transferring necessary information and data, and the like. A storage device 105 stores and manages an operating system (OS), a system program, various kinds of application software, parameter data necessary for this embodiment, and the like. The storage device 105 is formed by, for example, a hard disk or a flash ROM. A CPU 104 uses a work memory 107 to read out software or a program stored in the storage device 105 and to execute processing. An operation unit 106 (to be also referred to as a "UI" hereafter) serving as a user interface accepts input related to the execution of processing from a user and performs display to the user. The operation unit 106 includes input devices such as a keyboard, a mouse, and the like. Also, the data input/output device 108 inputs/outputs data to/from an external storage medium such as an SD card, or the like, and can input/output data to/from, for example, an external storage medium storing the data of an image capturing apparatus. In addition, input/output of data to/from an image capturing apparatus may be performed without intervention of an external storage medium by directly connecting the image capturing apparatus (not shown) to the data input/output device 108 or a data transfer unit 109.

The output apparatus 103 includes the data transfer unit 109, a printer control unit 112, an image processing unit 110, a printing unit 111, and receives print data from the PC 101. In this embodiment, the print data includes HDR data as input image data, display information of the display apparatus 102, an image processing parameter and printer control data that are unique data of the storage medium, and printing information such as the printing quality, the print medium, and the like, selected by the user on the operation unit 106. In this case, a print medium is, for example, paper media such as a print sheet, and the like.

The data transfer unit 109 obtains the HDR data, the display information of the display apparatus 102, the image processing parameter, and the print information from the print data received from the PC 101, transmits these obtained pieces of information and data to the image processing unit 110 to obtain printer control data, and transmits the obtained printer control data to the printer control unit 112. In this embodiment, the HDR data stored in the storage device 105 of the PC 101 serves as the input image data received by the output apparatus 103. In addition, although the image processing unit 110 is formed in the display apparatus 102 in this embodiment, it may be formed in the PC 101.

Also, the image processing parameter and the printer control data are stored in the storage device 105 of the PC 101 or a storage device (a hard disk, a ROM, or the like) (not shown) of the output apparatus 103. It may be arranged so that these pieces of information will be selected based on the print information included in the print data and be transmitted to the image processing unit 110 and the printer control unit 112. The printer control unit 112 controls the operation of the printing unit 111 in accordance with the printer control data. The printing unit 111 performs printing in accordance with the inkjet printing method. Although the inkjet printing method will be exemplified as the method employed in the printing performed by the printing unit 111 in this embodiment, another printing method such an electrophotography method, or the like, may be employed. The display apparatus 102 includes a display controller 114 that controls image display, and the display controller 114 generates, for example, display data.

Figure 2:
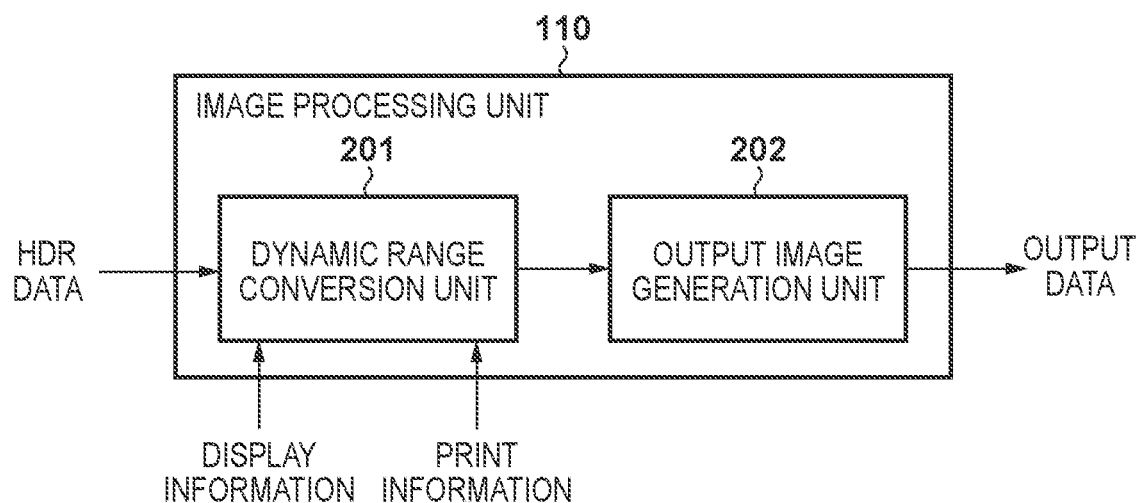
FIG. 2 is a block diagram showing the arrangement of an image processing unit.

FIG. 2 is a block diagram showing the arrangement of the image processing unit 110 according to this embodiment. In the image processing unit 110 according to this embodiment, the HDR data, the display information of the display apparatus 102, and the print information are input to a dynamic range conversion unit 201. As will be described later, the dynamic range conversion unit 201 uses each piece of input information to convert the HDR data into image data of a dynamic range that can be input to an output image generation unit 202. The dynamic range of the image data to be input to the output image generation unit 202 is narrower as a luminance range than the high dynamic range of the input HDR data. The dynamic range to be input to the output image generation unit 202 is, for example, a dynamic range that has the maximum luminance 100 cd/m² of SDR data. Also, a dynamic range whose maximum value is set by the reflection luminance specified by the sheet information set by the user may also be used. In this embodiment, assume that the dynamic range conversion unit 201 converts the dynamic range of the HDR data into the dynamic range of SDR data.

Next, the output image generation unit 202 generates, for the image data (RGB data) output from the dynamic range conversion unit 201, data to be used for printing by the printhead of the printing unit 111.

Figure 3:
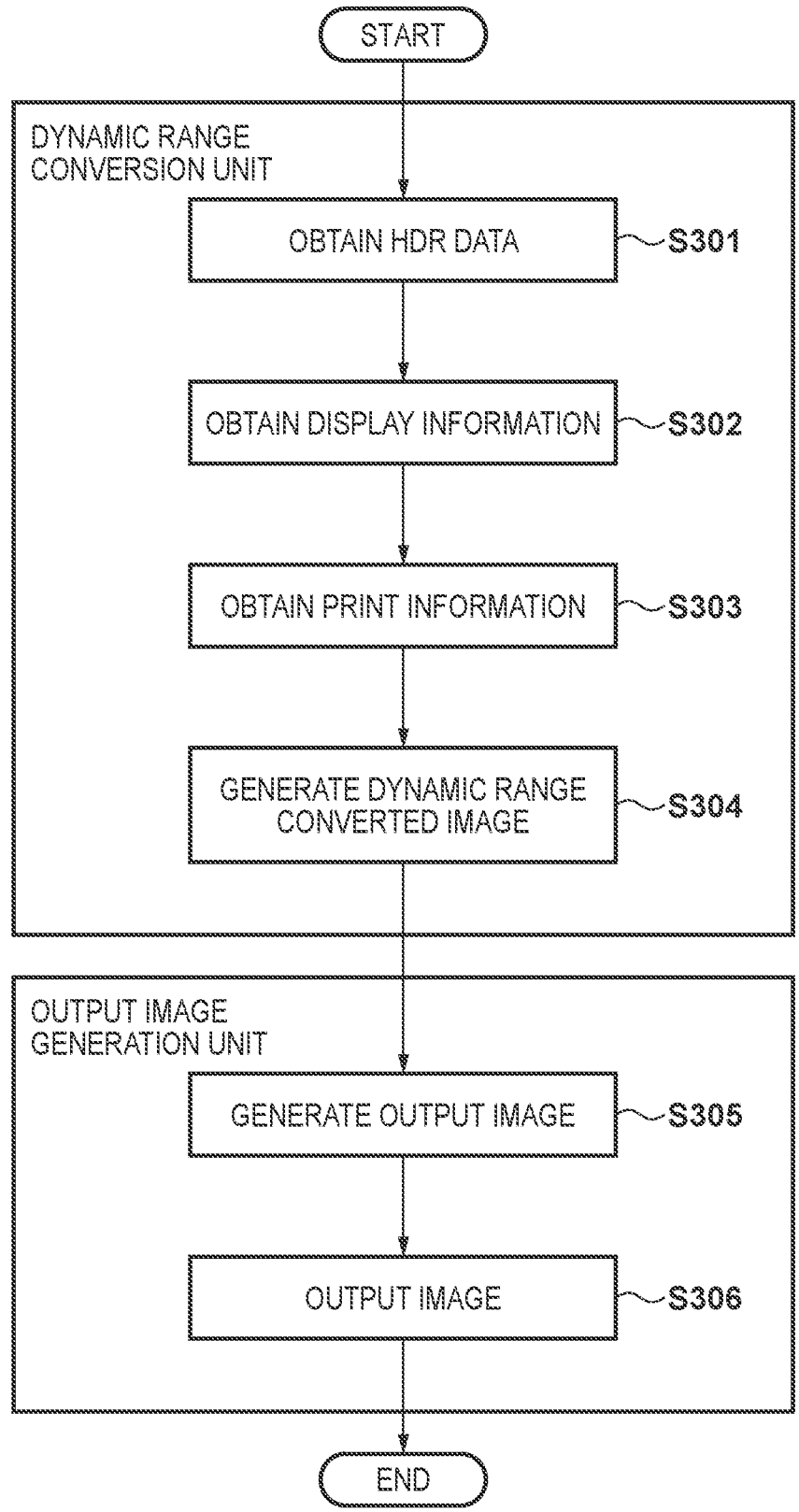
FIG. 3 is flowchart illustrating the procedure of image processing.

FIG. 3 is a flowchart illustrating image processing according to this embodiment. In step S301, the dynamic range conversion unit 201 obtains the RGB data of the HDR data. The HDR data according to this embodiment is stored in accordance with the above-described HLG method that defines the tone based on a relative luminance value. At this stage, the tone is defined for each of R, G, and B elements based on a relative luminance value. Although the HLG method is employed in this embodiment, another method may be employed as long as the tone is defined relatively. In this embodiment, the HDR data obtained in step S301 is also used in the display operation performed by the display apparatus 102, which is an HDR display.

In step S302, the dynamic range conversion unit 201 obtains the display information of the display apparatus 102. In this embodiment, an image represented by HDR data is displayed on the display apparatus 102. At the point of time in which the user who is to perform printing by the output apparatus 103 has pressed a print instruction button on a print application or a print button on a panel of the output apparatus 103, the dynamic range conversion unit 201 obtains the display information storing the display state of the display apparatus 102 at that time via the display apparatus 102 or the PC 101. Also, in a case in which the display information is stored in the PC 101 at a suitable time in synchronization with the display, the dynamic range conversion unit 201 may obtain the display information from the PC 101. Also, it may be arranged so that the display information will be obtained at the point of time in which the print application or the output apparatus 103 has been activated or reobtained at the timing at which the display setting has been changed on the side of the display apparatus 102. That is, it is sufficient as long as the display state of the display (the display apparatus 102) viewed by the user at the time of printing can be obtained. In addition, although a single display is connected to the PC 101 in this embodiment, a plurality of displays may be simultaneously connected to a single PC and used in some cases. In a case in which extended display is performed by a plurality of displays (display performed across a plurality of displays), the display that is displaying the print preview of HDR data will be recognized and the display information of this display will be obtained. In addition, in a case in which duplicate display is being performed among the plurality of displays (the same display is performed among the plurality of displays), the user may select the display from which the display information is to be obtained or the display form which the display information is to be preferably obtained may be set in advance.

In this embodiment, dynamic range information and system gamma information of the display are obtained as display information. The dynamic range information includes a displayable maximum luminance value (maximum luminance value) when HDR data is displayed on the HDR display and the luminance value for displaying black on the display. In this embodiment, for example, 1,000 cd/m² and 0 cd/m² are obtained as the maximum luminance value and the luminance value of black, respectively, of the display. The dynamic range of the display changes when the display setting of the display apparatus 102 is changed, and the luminance dynamic range displayable by the display itself can change depending on the performance of the display. In addition, the system gamma information includes a gamma value γ and information indicating that the display is a display in compliance with BT.2100. Since the display is in compliance with BT.2100, the gamma value γ of the OOTF of the HLG method defined by BT.2100 can be calculated by $$\gamma = 1.2 + 0.42 \ \text{Log}_{10}(L_w/1000) \tag{1}$$

BT.2100 is defined by equation (1) and is, for example, 1.2 when the maximum luminance value is 1,000 cd/m². However, depending on the object to be displayed, the user may change this gamma value γ via the display settings, and the gamma value γ set by the display settings will be applied as the display information in this case.

In step S303, the dynamic range conversion unit 201 obtains the print information. The print information is information for specifying the dynamic range after the dynamic range conversion. In this embodiment, for example, print mode information is obtained as the print information, and whether an input to the output image generation unit 202 is SDR data of sRGB values will be specified based on the print mode information. As a result, a maximum luminance value of 100 cd/m² is specified as the luminance dynamic range after the conversion for the SDR data. The print information can be obtained by obtaining information that indicates the sheet type, and suffices to be information that can specify the reflection luminance that is specified from the sheet type. Another piece of information may be used as long as it is information from which the luminance dynamic range information at the time of printing can be obtained. Also, a printed product may be irradiated with illumination of various kinds of illuminance depending on the observation environment. If the printed product is to be irradiated with illumination, the luminance dynamic range of a sheet will expand particularly due to the increase in the brightness of the whiteness of the paper. Hence, the reflection luminance of a sheet when the sheet is irradiated with illumination may be obtained as the luminance dynamic range information at the time of printing.

In step S304, the dynamic range conversion unit 201 generates, based on the display information obtained in step S302 and the print information obtained in step S303, image data obtained by converting the luminance dynamic range from the HDR data. That is, in this embodiment, dynamic range conversion processing is performed to convert a luminance dynamic range that has been obtained from the display information and has the maximum luminance value of 1,000 cd/m² based the obtained display information into a luminance dynamic range that has been obtained from the print information and has the maximum luminance value of 100 cd/m². As described above, the luminance dynamic range after the dynamic range conversion becomes a luminance dynamic range expressed by the absolute luminance value specified by the print information.

As described above, Hybrid Log Gamma (HLG) and Perceptual Quantization (PQ) are defined as two image transfer functions of HDR data in, for example, Recommendation ITU-R (International Telecommunication Union Radiocommunication Sector) BT.2100. The HDR data according to this embodiment is data converted by a transfer function OETF of the HLG method described above. Hence, the dynamic range conversion unit 201 performs luminance conversion on the HDR data so that a luminance signal level x of the HDR data will be converted into a luminance signal level y by using a transfer function EOTF (an inverse function of OETF) and a transfer function OOTF of the HLG method determined by $$y = OOTF\left[OETF^{-1}[\max 0, (1-\beta)E' + \beta)]\right] \quad (2)$$

$$E = OETF^{-1}[x] = \begin{cases} \dfrac{x^2}{3} & 0 \le x \le 1/2 \\ \dfrac{\left\{\exp\left(\dfrac{x-c}{a}\right)+b\right\}}{12} & 1/2 < x \le 1 \end{cases}$$

$$\beta = \sqrt{3\left(\dfrac{L_B}{L_w}\right)^{1/\gamma}}$$

$$OOTF[E] = \alpha Y_s^{\gamma-1} E$$

where γ is a value calculated by equation (1), Lw is a maximum luminance value of the display, and $L_B$ is a luminance value of black of the display. In this embodiment, assume that $L_B$ is 0. E' is an HLG method signal, and x is a signal normalized into a range between 0 and 1. α is a variable for a user gain, $Y_S$ is a normalized luminance value, and E is a linear optical signal normalized into a range between 0 and 1.

Next, the dynamic range conversion unit 201 sets the data obtained from the OOTF processing as data whose maximum luminance value is 1,000 cd/m², and performs dynamic range conversion processing to convert this data into data whose luminance dynamic range has a maximum luminance value of 100 cd/m² corresponding to the value obtained from the print information. In this embodiment, the dynamic range conversion unit 201 converts the RGB data obtained from the OOTF processing into data which has a luminance value Y and color differences CbCr by

Y=0.29900×R+0.58700×G+0.114400×B  (3)

Cb=−0.16874×R−0.33126×G+0.50000×B  (4)

Cr=0.50000×R−0.41869×G−0.081×B  (5)

The dynamic range conversion unit 201 performs the luminance dynamic range conversion to convert data of the converted luminance value Y into a luminance value Y' based on a conversion curve indicated by a solid line in a graph (the abscissa indicates an input luminance value and the ordinate indicates an output luminance value) shown in FIG. 4A. A short dashed line shown in FIG. 4A indicates a state in which the input and the output are linear. In this embodiment, as indicated by the solid line shown in FIG. 4A, linear conversion is performed from a dark portion to a portion of a specific luminance, and conversion by a Log characteristic is performed in a highlight portion. As shown in FIG. 4A, it is preferable to perform dynamic range compression processing to maintain the contrast of the image while reproducing the highlight region of the HDR data. In addition, FIG. 4B is a graph in which a dynamic range compression method similar to that of FIG. 4A has been employed, and shows the luminance relationship before and after the dynamic range conversion in a case in which the maximum luminance value of the display is 2,000 cd/m². As shown in FIGS. 4A and 4B, dynamic range conversion can be performed, in accordance with the displayable dynamic range of the display, based on the display information obtained in step S302 and the print information obtained in step S303. Subsequently, the dynamic range conversion unit 201 combines the converted luminance value Y' and the color difference component to perform conversion into RGB data by R=Y+1.40200×Cr  (6)

G=Y−0.34414×Cb−0.71414×Cr  (7)

B=Y+1.77200×Cb  (8)

Although luminance dynamic range compression has been described above, color gamut compression processing of converting the wide color gamut space of HDR data (for example, ITU-R BT.2020) into the color gamut of SDR data (for example, ITU-R BT.709) may be performed for the color gamut.

Next, in step S305, the output image generation unit 202 generates output image data to be output to the printing unit 111. For example, the output image generation unit 202 performs color conversion processing to convert the SDR data (RGB data), which was output in step S304, into device dependent RGB data. The output image generation unit 202 performs ink color resolution processing to convert the device dependent RGB data into ink color data, and performs tone correction processing to perform tone correction so that the ink color data will be linearly associated with the tone characteristic of the printing apparatus. Furthermore, the output image generation unit 202 performs halftone processing to convert the ink color data into ink dot ON/OFF information, masking data conversion processing which generates binary data to be printed in each print scan of the printhead, and the like.

Next, in step S306, the output image generation unit 202 transmits the generated output image data to the printing unit 111, and an image is subsequently output on a print medium.

As described above, HDR data of the HLG method is displayed differently depending on the performance of the display apparatus 102. According to this embodiment, the display information of the display apparatus 102 viewed by the user and the print information of the output apparatus 103 can be used at the time of printing of the HDR data of the HLG method so that dynamic range conversion corresponding to the display state of the display can be performed. As a result, a print output corresponding to the display of each of the plurality of the display apparatuses 102 with different performances can be obtained.

Second Embodiment

Points different from the first embodiment will be described in the second embodiment hereafter. This embodiment will describe a case in which HDR data of the PQ method is input.

In this embodiment, HDR data (RGB data) obtained in step S301 of FIG. 3 is recorded in accordance with the PQ method that defines the tone in an absolute luminance value described above. In this embodiment, assume that information up to 10,000 cd/m² has been recorded in the HDR data.

In step S302, a dynamic range conversion unit 201 obtains, as display information, the dynamic range information of a display and a luminance dynamic range conversion method. The description of the dynamic range information of the display is similar to that of the first embodiment. The luminance dynamic range conversion method is information related to the method of converting the luminance dynamic range of the PQ method defined by the maximum luminance value of 10,000 cd/m² into the luminance dynamic range of the display. This information suffices to be information that allows conversion to be executed in the process of step S304, and may be a conversion method name if the conversion is to be performed by a known method or may be information of a path in which a conversion module (for example, a conversion curve to be described later) is stored.

FIGS. 5A and 5B are graphs showing two kinds of conversion curves for luminance dynamic range conversion of a display. FIG. 5A shows a conversion method in which every data of a high luminance portion whose value is higher than 1,000 cd/m² and cannot be displayed on the display included in the HDR is displayed as 1,000 cd/m². On the other hand, FIG. 5B shows a method similar to FIGS. 4A and 4B in which data of a dark portion to a specific luminance portion is converted linearly and a highlight portion is converted by a Log characteristic. In this embodiment, since the HDR data is of the PQ method, although the conversion of FIG. 5A and the conversion of FIG. 5B does not result in a difference between luminance ranges 501 of FIGS. 5A and 5B in relation to the display operation by the display, a difference in the display operation can be observed in between luminance ranges 502 of FIGS. 5A and 5B.

The print information obtainment process of step S303 is similar to that according to the first embodiment.

In step S304, the dynamic range conversion unit 201 generates, based on the display information obtained in step S302 and the print information obtained in step S303, data in which the luminance dynamic range has been converted from that of the HDR data. In this embodiment, the dynamic range conversion unit 201 performs dynamic range conversion processing to convert information of a luminance dynamic range of the HDR data that has a maximum luminance value of 10,000 cd/m² into a luminance dynamic range obtained from the print information that has a maximum luminance value of 100 cd/m².

The HDR data according to this embodiment is data converted by a transfer function (an inverse function of EOTF) according to the PQ method described above. Hence, the dynamic range conversion unit 201 performs luminance conversion on the HDR data so that a luminance signal level x of the HDR data will be converted into a luminance signal level γ by using the EOTF of the PQ method defined by $$y = EOTF[E'] = 10000Y \qquad (9)$$

$$Y = \left( \frac{\max\left[\left(E'^{1/m2)} - C_1\right), 0\right]}{C_2 - C_3 E'^{1/m2}} \right)$$

In this embodiment, $L_B$ is 0. E' is a PQ method signal, and x is a signal normalized into a range between 0 and 1.

Next, the dynamic range conversion unit 201 sets the data converted from the EOTF processing as data whose maximum luminance value is 10,000 cd/m², and performs dynamic range conversion processing to convert this data into data whose luminance dynamic range has a maximum luminance value of 100 cd/m². In this embodiment, the dynamic range conversion unit 201 converts RGB data obtained by the EOTF processing into data of a luminance value Y and color differences CbCr by equations (3), (4), and (5). Subsequently, the dynamic range conversion unit 201 performs conversion on the data of the converted luminance value Y by the conversion curve shown in FIG. 5A, and further performs conversion by the conversion curve shown in FIG. 4A to obtain the SDR data as a result of the conversion. Since each of conversion operations by the conversion curves shown in FIGS. 4A and 5A can be converted by 1DLUT, conversion may be performed by using 1DLUT obtained by combining the 1DLUTs of the respective conversion curves. Subsequently, the converted luminance value and the color differences can be combined to perform conversion into RGB data by equations (6), (7), and (8). In addition, although FIG. 5A has been used in the above description, FIG. 5B may also be used.

The processes of steps S305 and S306 are similar to those according to the first embodiment.

As described above, in the HDR data of the PQ method, the highlight portion of the data will be displayed differently depending on the performance of a display apparatus 102. According to this embodiment, the display information of the display apparatus 102 viewed by the user and the print information of an output apparatus 103 can be used at the time of printing of the HDR data of the PQ method so that dynamic range conversion corresponding to the display state of the display can be performed. As a result, a print output corresponding to the display of each of the plurality of the display apparatuses 102 with different performances can be obtained.

Third Embodiment

Points different from those of the first embodiment and the second embodiment will be described in the third embodiment hereafter. This embodiment will describe a case in which HDR data of the PQ method is input and undergoes luminance dynamic range conversion on the side of a display apparatus 102 to be displayed on an SDR display. In this embodiment, the display apparatus 102 is an SDR display.

In this embodiment, HDR data of the PQ method is obtained in step S301 of FIG. 3.

In step S302, in a manner similar to the second embodiment, the dynamic range information and the luminance dynamic range conversion method of the display are obtained. Since the display apparatus 102 is an SDR display in this embodiment, 100 cd/m² and 0 cd/m² cm are obtained as a maximum luminance value and a luminance value of black, respectively, of the display. A description of the obtainment of the luminance dynamic range conversion method is similar to that according to the second embodiment.

Figure 6:
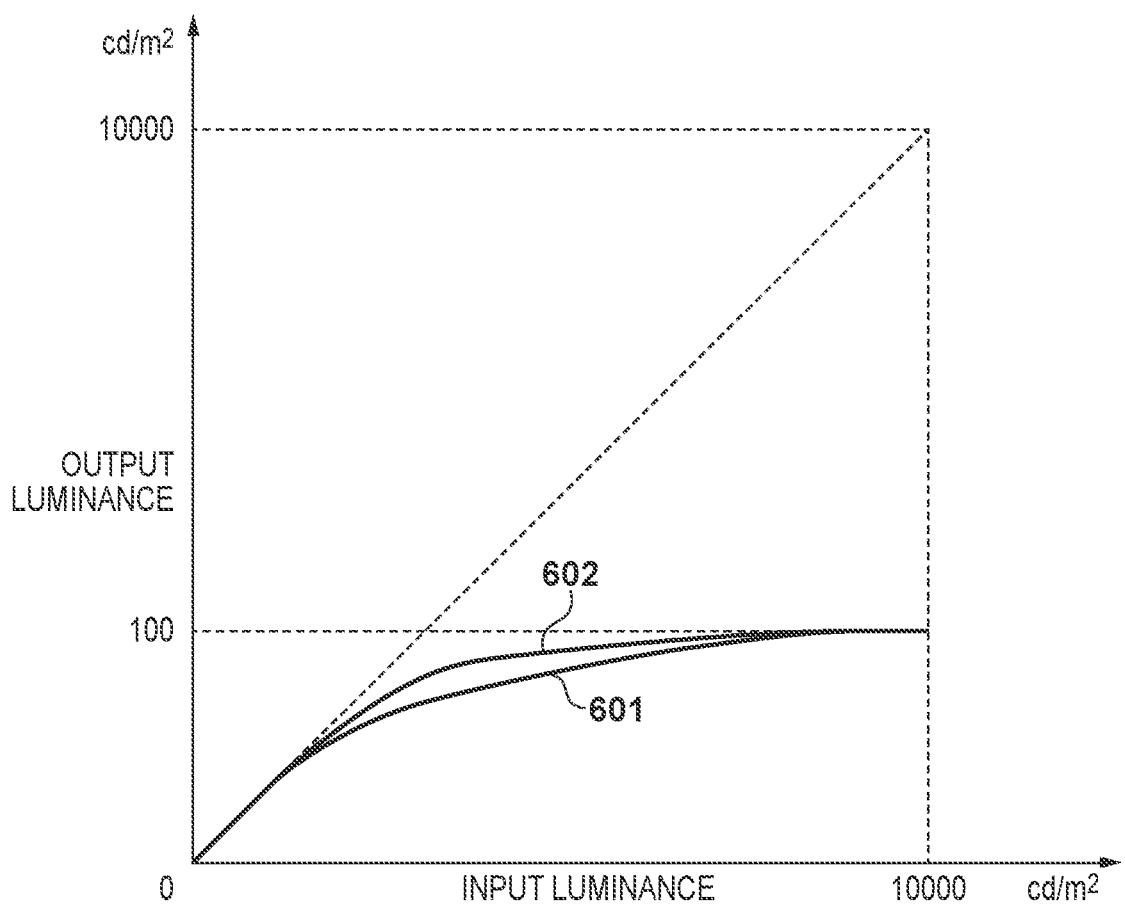
FIG. 6 is a graph showing a conversion curve.

FIG. 6 is a graph showing a conversion curve of the luminance dynamic range conversion of the display according to this embodiment. FIG. 6 corresponds to a state in which the maximum luminance value of the luminance dynamic range of the display of FIG. 5B has been set to 100 cd/m². Although luminance dynamic range conversion as shown in FIG. 6 will be performed in this embodiment, the dynamic range conversion method will change depending on the manufacturer or the model of the display as indicated by conversion curves 601 and 602.

The obtainment of print information of step S303 is performed in a manner similar to that according to the first embodiment.

In step S304, a dynamic range conversion unit 201 generates, based on the display information obtained in step S302 and the print information obtained in step S303, image data obtained by converting the luminance dynamic range of the HDR data. In this embodiment, the dynamic range conversion unit 201 performs dynamic range conversion processing to convert the information of the luminance dynamic range held by the HDR data into data whose luminance dynamic range has a maximum luminance value of 100 cd/m² corresponding to the value obtained from the print information.

As described in the second embodiment, HDR data is converted into information corresponding to the luminance signal level of the display. Subsequently, dynamic range conversion processing is performed on the converted data to convert the luminance dynamic range into that corresponding to the luminance dynamic range whose maximum luminance value is 100 cd/m² obtained from the print information. In this embodiment, the post-conversion luminance dynamic range of the display side and that of the printing side are equally 100 cd/m². Hence, in step S304 of this embodiment, luminance dynamic range conversion is performed on the data of a converted luminance value Y by using the conversion curve shown in FIG. 6, and the converted luminance and the color difference components are combined to perform conversion into RGB data of SDR by equations (6), (7), and (8).

The processes of steps S305 and S306 are similar to those of the first embodiment.

As described above, in a case in which display is performed on an SDR display by performing luminance dynamic range conversion processing on the side of the display apparatus 102, the display may differ depending on the fact that the luminance dynamic range conversion method will differ depending on the display apparatus 102. According to this embodiment, by obtaining the display information of the SDR display and the print information of an output apparatus 103 at the time of printing of the HDR data, dynamic range conversion corresponding to the display state of the display can be performed. As a result, a print output corresponding to the display of each of the plurality of the SDR displays with different performances can be obtained.

Fourth Embodiment

Points different from those of the first embodiment to the third embodiment will be described in the fourth embodiment hereafter. In the first embodiment to the third embodiment, processing was performed to convert the data into the luminance signal level of a display by equations (2) and (9). This embodiment will describe an arrangement that obtains data already converted into the luminance signal level of the display. In this embodiment, the HDR data obtained in the process of step S301 of FIG. 3 may be in compliance with either the HLG method or the PQ method.

In step S302, a dynamic range conversion unit 201 obtains, as display information, luminance dynamic range information of a display and data that has been converted into the luminance signal level of the display and in which the tone is defined by an absolute luminance value. That is, in a case in which HDR data of the HLG method is to be obtained, the RGB data which has undergone OOTF processing according to the first embodiment will be obtained. Also, in a case in which HDR data of the PQ method is to be obtained, RGB data that has been obtained by using the conversion curve of FIG. 5A to perform conversion on RGB data that has undergone the EOTF processing according to the second embodiment will be obtained. Data obtained by performing OETF processing (an inverse function of the EOTF) according to the PQ method on these data may also be obtained. These data can be generated by a display controller 114 in an image processing process of the display processing in a display apparatus 102, and be generated in the display apparatus 102 or in an apparatus outside the display apparatus 102 such as a PC 101, or the like. These data are stored in, for example, a storage unit of the display apparatus 102 or a storage unit of the apparatus outside the display apparatus 102 such as the PC 101, or the like. Data corresponding to the display state of the display at the point of time when the user has pressed a print button can be obtained from the storage unit.

The print information obtainment process of step S303 is similar to that according to the first embodiment.

In step S304, the dynamic range conversion unit 201 generates, based on the display information obtained in step S302 and the print information obtained in step S303, image data in which the luminance dynamic range has been converted from that of the HDR data. In this embodiment, the dynamic range conversion unit 201 will use the conversion curve of FIG. 4A to perform, based on the display information, luminance dynamic range conversion as described above on the HDR data obtained in step S301. The dynamic range conversion unit 201 will convert the information of the luminance dynamic range held by the data in which the maximum luminance value is 1,000 cd/m² into data whose luminance dynamic range has a maximum luminance value of 100 cd/m² corresponding to the value obtained from the print information.

The processes of steps S305 and S306 are the similar to those of the first embodiment.

As described above, data that has been converted into the luminance signal level of the display and whose tone is defined by an absolute luminance value is obtained as the display information, and the luminance dynamic range conversion is performed. Hence, a print output corresponding to the display of each of the plurality of display apparatuses 102 with difference performances can be obtained. Furthermore, since the dynamic range conversion unit 201 will use HDR data that has undergone the OOTF processing or the EOTF processing, it will be possible to reduce the processing load on the side of an output apparatus 103.

Although the luminance dynamic range conversion has been performed by using YCbCr in this embodiment, the luminance dynamic range conversion may also be performed by using ICtCp. ICtCp is a color space that has a high dynamic range so as to target a wide color gamut signal. Here, let I be a luminance component and CtCp be color difference components. The luminance component I is information that takes human vision characteristics in a wide luminance range into consideration. As a result, using the ICtCp color spaces allows luminance dynamic range conversion to be performed by taking the human vision characteristics into consideration.

Figure 7:
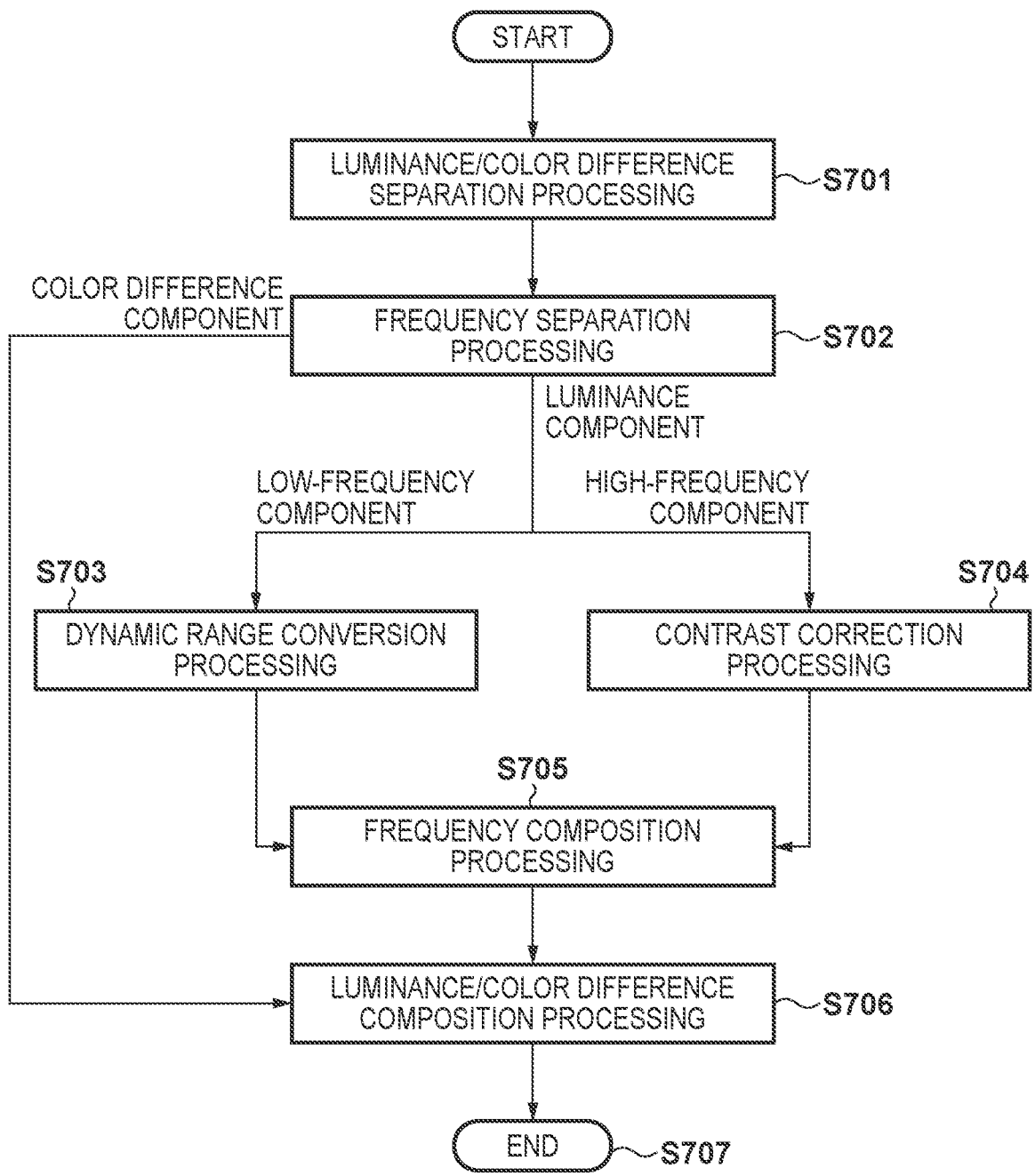
FIG. 7 is a flowchart illustrating the processing of processing using dynamic range conversion processing.
Figure 8:
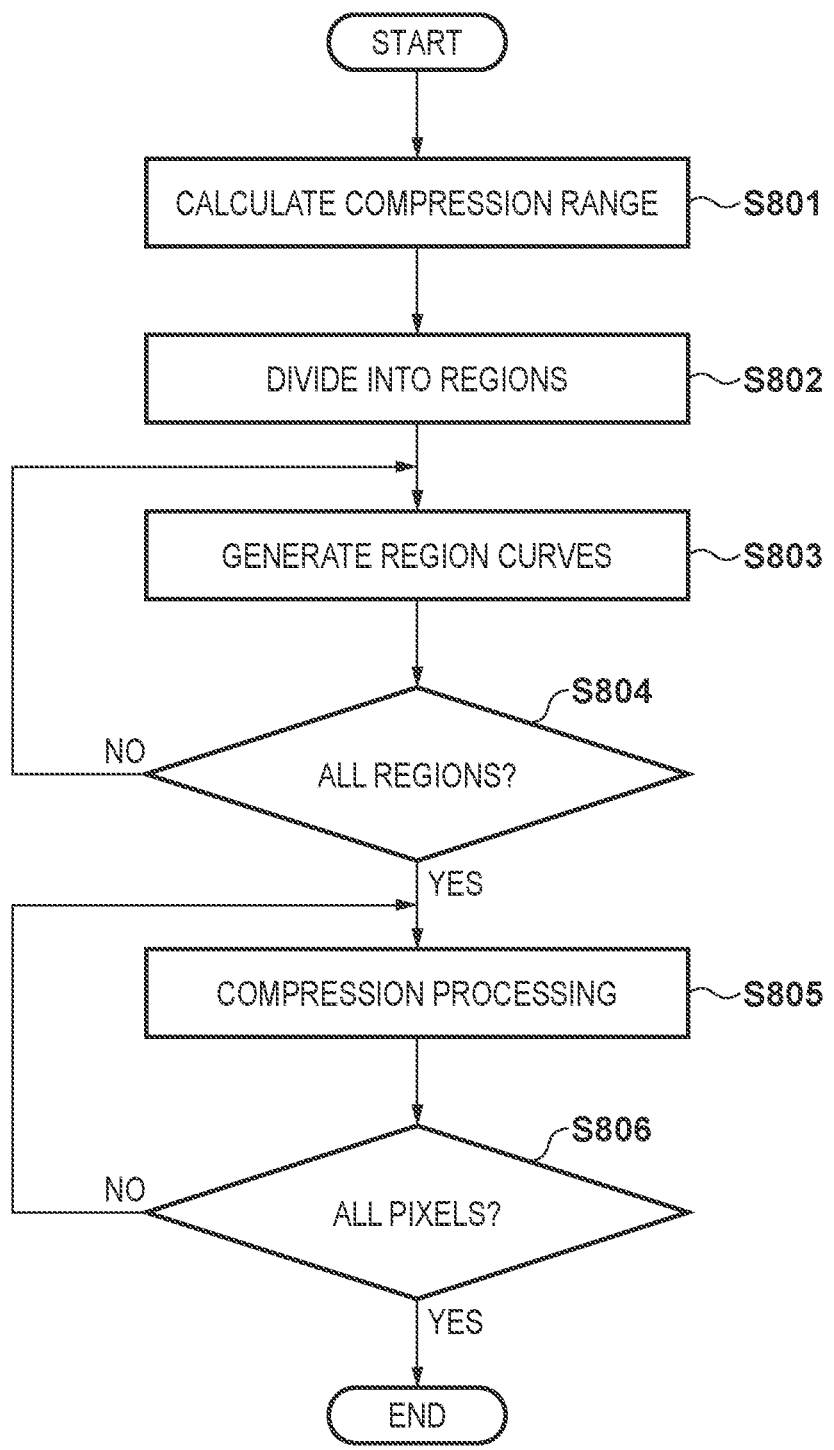
FIG. 8 is a flowchart illustrating the procedure of the dynamic range conversion processing.

In this embodiment, instead of performing luminance dynamic range conversion based on the characteristics shown in FIGS. 4A and 4B, the dynamic range conversion processing may be performed in accordance with the processing shown in the flowcharts of FIGS. 7 and 8.

In step S701 of FIG. 7, the dynamic range conversion unit 201 separates the RGB data obtained from the OOTF processing by equations (3), (4), and (5) into a luminance component and color difference components.

In step S702, the dynamic range conversion unit 201 performs processing to separate a low-frequency component and a high-frequency component of the data converted into the luminance component. This is because processing is changed between the low-frequency components and the high-frequency components based on the Retinex theory. The Retinex theory is a theory that models how the human brain perceives light and color. According to this theory, the intensity of light that enters the eye can be represented by a product of the reflectance of an object and illumination light illuminating the object, and the brightness and the color felt by a person depends more on the relative amount of change from the surroundings than an absolute optical amount. Here, the absolute optical amount is the illumination light illuminating the object, and the relative amount of change is the reflectance of the object.

In step S702, the dynamic range conversion unit 201 extracts the low-frequency component of the image data as an illumination light component illuminating the object. A low pass filter is applied to create the low-frequency component. As the processing method, a spatial filter may be applied or a target frequency component may be temporarily converted into a spatial frequency by FFT and turned back into the frequency component by IFFT after undergoing filter processing. The frequency to be the target may be determined, in consideration of the human vision characteristics, based on the sheet size of the sheet on which the printed product is to be observed or an observation distance.

In order to obtain the high-frequency component, a high pass filter that is the opposite of the low pass filter may be applied or the obtained low-frequency component may be subtracted from the original image.

In step S703, the dynamic range conversion unit 201 performs dynamic range conversion processing on the low-frequency component based on the input luminance dynamic range information and the output luminance dynamic range information. The processing of step S703 will be described in detail later with reference to FIG. 8.

In step S704, the dynamic range conversion unit 201 performs contrast correction processing on the high-frequency component. The contrast correction processing is processing in which an obtained image is multiplied by a coefficient k. In a case in which the printed product is to be faithfully brought close to the input data, k=approximately 1. In a case in which degradation such as ink bleeding on the printed product is to be further considered, a value equal to one or more is set as the coefficient k.

In step S705, the dynamic range conversion unit 201 combines the image data in which the dynamic range conversion has been performed on the low-frequency component and the image data in which contrast correction has been performed on the high-frequency component. As a result, the image data is compressed into a predetermined dynamic range, and a luminance image with a corrected contrast is obtained.

In step S706, the dynamic range conversion unit 201 combines the luminance component and the color difference component to perform conversion into RGB data by equations (6), (7), and (8). After the process of step S706, the processing of FIG. 7 ends.

The dynamic range conversion processing of step S703 will be described by using the flowchart of FIG. 8.

In step S801, the dynamic range conversion unit 201 calculates a compression range. In this embodiment, dynamic range conversion processing is performed to convert the luminance dynamic range which has been obtained from the display information and has a maximum luminance value of 1,000 cd/m² into the luminance dynamic range that has been obtained from the print information and has a maximum luminance value of 100 cd/m². In addition, the dynamic range conversion unit 201 obtains an exposure luminance value Ya from the metadata of HDR data. This is the point where the user has set the exposure during an image capturing operation. Assume that the exposure luminance value Ya is 18 cd/m² in this embodiment.

In step S802, the dynamic range conversion unit 201 divides the image of the HDR data into regions. The region division of the image may be performed by dividing the image into predetermined rectangular size regions or by creating groups of similar luminance pixels based on the information of the luminance data. In the latter case, it is possible to restore the contrast of a specific luminance range that has undergone region division, and an image with better contrast can be obtained. In addition, it is possible to use not only the luminance data, but also the RGB data. As a result, image recognition can be performed by the RGB data, and a method that restores the contrast in accordance with each type of recognized region can be employed.

Figure 9A:
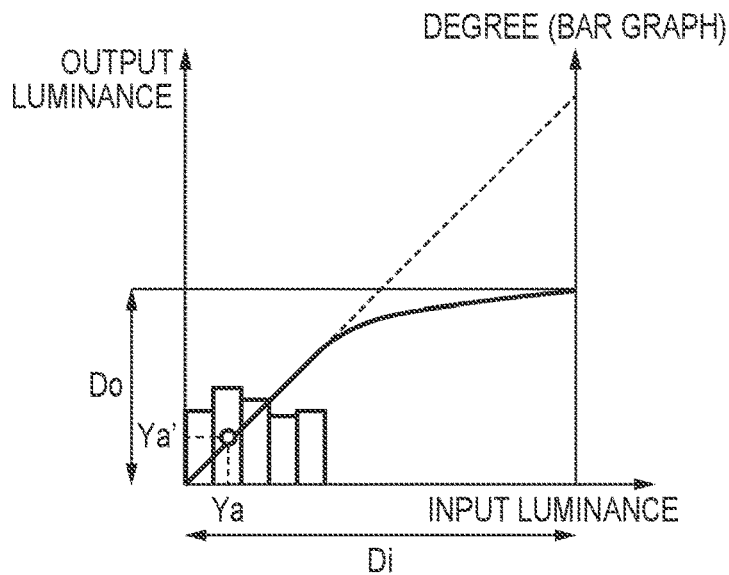
FIGS. 9A, 9B, and 9C are graphs each showing a conversion curve.
Figure 9B:
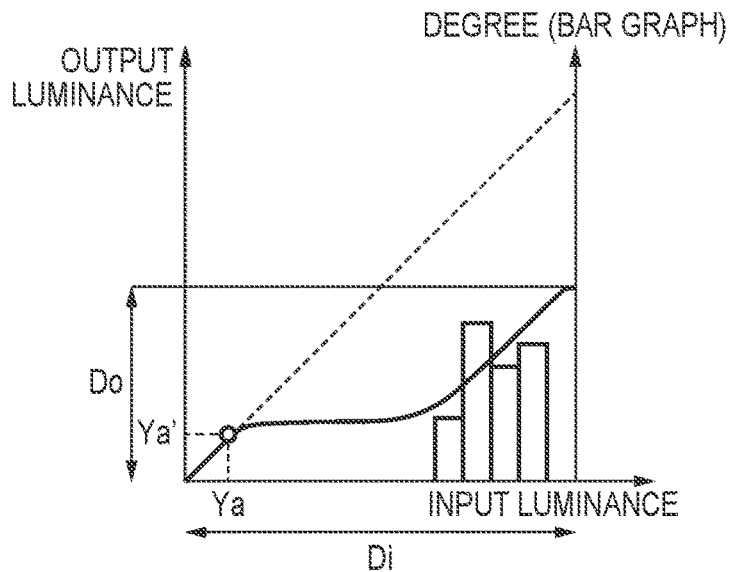
Figure 9C:
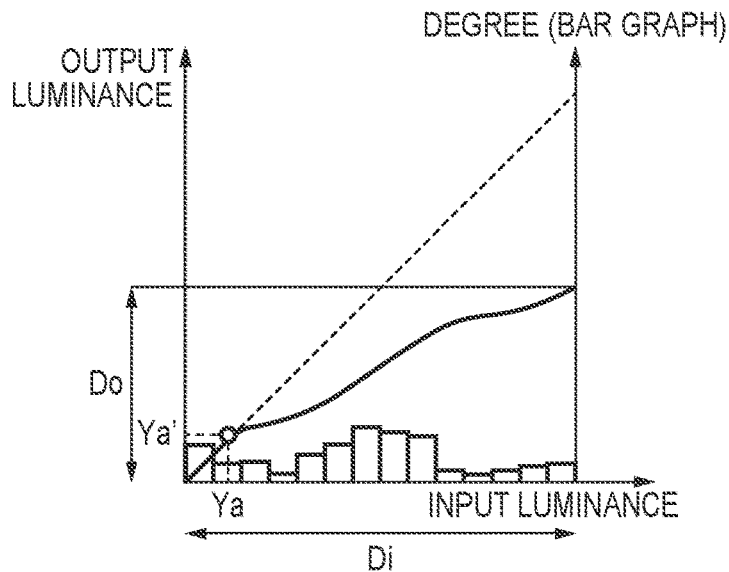

In step S803, the dynamic range conversion unit 201 creates a conversion curve for each region divided in step S802. FIGS. 9A, 9B, and 9C are graphs each showing an example of a conversion curve. FIG. 9A is a graph representing the conversion curve of a given region. The abscissa indicates an input luminance value, the ordinate indicates an output luminance value, and the thick line indicates the conversion curve. The bar graph shows the luminance distribution of the region, and the bars correspond to the degrees of a predetermined luminance range (corresponding to the ordinate on the right). In FIGS. 9A, 9B, and 9C, Di denotes a pre-conversion luminance dynamic range and Do denotes a post-conversion luminance dynamic range. In a case in which the slope is one, that is, 45°, the input luminance value and the output luminance value will match, and image change will not occur in this portion. That is, the pre-conversion contrast of the dynamic range will be maintained. As the slope decreases (to an angle less than 45°), the post-conversion contrast degrades compared to the pre-conversion contrast. The contrast needs to be maintained to obtain a suitable post-conversion image, and it is preferable to set the slope to one. Since a low-frequency component is being handled in this case, conversion needs to be performed, as much as possible, to set the slope to one to maintain the contrast of the low-frequency component. FIG. 9B represents the conversion curve of another region, but the luminance distribution is skewed toward the high-luminance side. In a similar manner to FIG. 9A, a slope close to one is assigned to a high-degree luminance group in accordance with the degrees of the distribution. FIG. 9C represents a conversion curve of a region in which the luminance is distributed uniformly. In this case, the slope cannot be assigned to one even if a high-degree luminance group is present. This is because assigning a slope of one to a specific luminance group will cause the slope of another luminance group to be set closer to zero due to the narrowness of the post-conversion luminance dynamic range Do. In such a case, the slope will be assigned on average among the luminance groups, and the slope will be distributed in correspondence with each degree so no luminance group, among the luminance groups, will have a slope which is set extremely close to zero. In addition, FIGS. 9A to 9C representing different regions of the image have a common portion. This common portion is, for example, the exposure luminance value Ya obtained in step S801, and each conversion curve is created so that the luminance value after the conversion will constantly be a predetermined value Ya'. As a result, the exposure luminance set by the user at the time of image capturing can be maintained while reproducing the tone on the high-luminance side.

In step S804, the dynamic range conversion unit 201 determines whether a conversion curve has been created for every divided region. If it is determined that the conversion curve has not been created for every divided region, the processing is repeated from step S803. Otherwise, the process advances to step S805.

In step S805, the dynamic range conversion unit 201 uses each created conversion curve to perform dynamic range compression procession on each pixel. At this time, the processing is performed in consideration of the information of the surrounding regions so as not to create locations where the tone becomes discontinuous between regions. More specifically, a window of the same degree as the region can be assigned so that weighting can be performed based on the area included in the window and the dynamic range compression processing can be performed based on this ratio. Also, since a simple area ratio can cause an image defect such as a halo to be generated on the boundary, the weight may be changed based on the average luminance value of the target region. That is, an image defect can be suppressed by reducing the weight compared to the target pixel in accordance with the increase in the variation of the average luminance values of the respective surrounding regions.

In step S806, the dynamic range conversion unit 201 determines whether the processing of step S805 has been performed on all of the pixels. If it is determined that the processing has not been performed on all of the pixels, the processing is repeated from step S805. Otherwise, the processing of FIG. 10 ends.

In this manner, by separating the image data into a high-frequency component and a low-frequency component based on the Retinex theory and performing luminance dynamic range conversion on the low-frequency component by using a conversion curve for each region of the image, a high-contrast image that considers the human vision characteristic can be generated.

Figure 10:
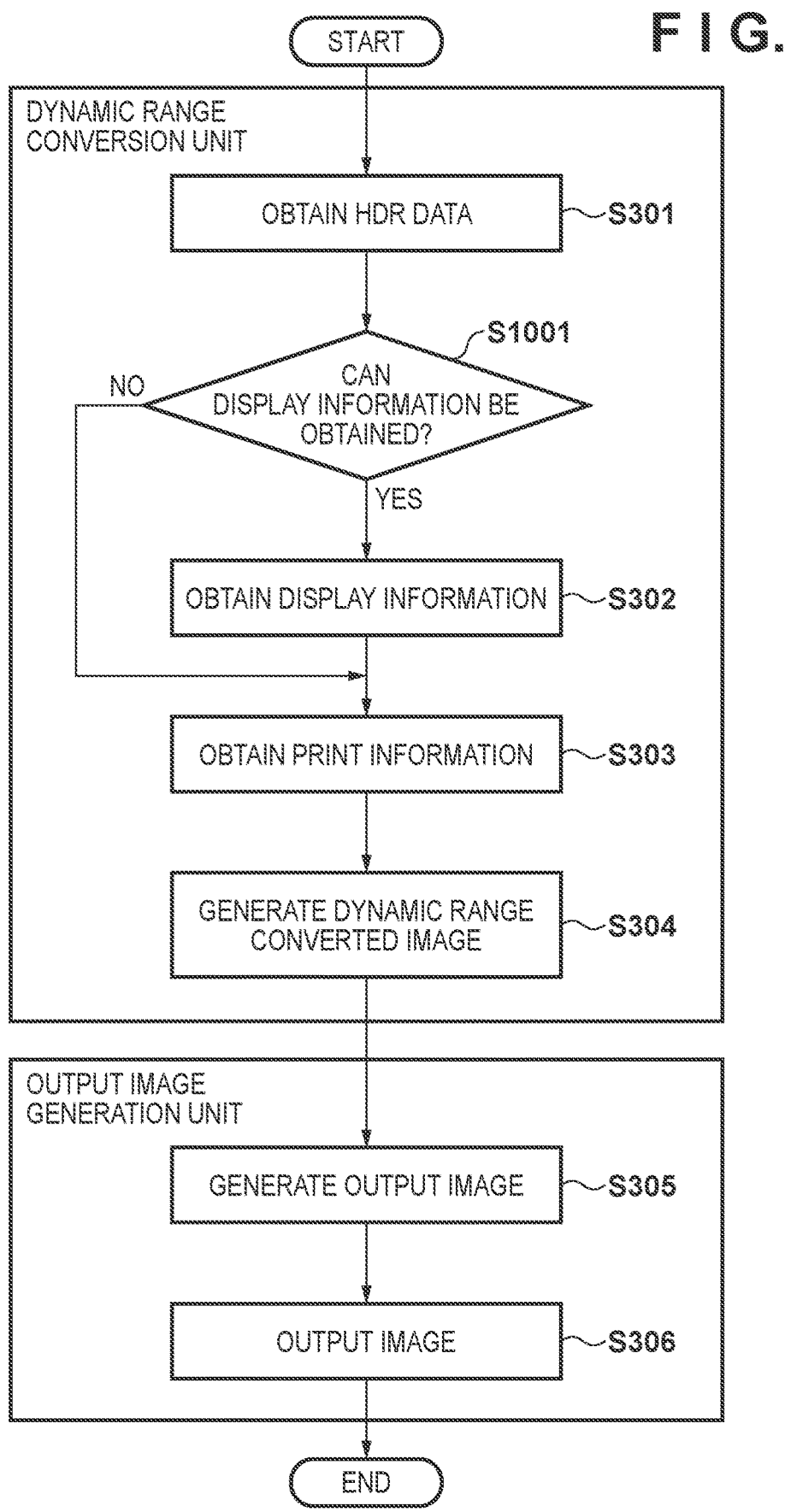
FIG. 10 is a flowchart illustrating the procedure of image processing.

It may be impossible to obtain the display information in some cases in the first embodiment and the second embodiment. Such cases may be, for example, a case in which the display information cannot be obtained from the display apparatus 102, a case in which the HDR data is directly input to the output apparatus 103 which does not have a display function, or the like. The processing performed in such cases is shown in FIG. 10. In FIG. 10, a determination as to whether the display information can be obtained is performed after the process of step S301. If it is determined that the display information cannot be obtained, the process of step S302 is skipped, and the image data is generated by luminance dynamic range conversion by using the HDR data and the print information in the process of step S304 following the process of step S303. In the luminance dynamic range conversion performed in such cases, in the case of HDR data in which the tone is defined by a relative luminance, after the EOTF (the inverse function of OETF) processing is performed, the luminance dynamic range defined by the relative value held by the data is made to relatively correspond to the luminance dynamic range of the output apparatus 103. On the other hand, in the case of HDR data in which the tone is defined by an absolute luminance value such as the HDR data of the PQ method, after the EOTF processing, the conversion curves shown in FIGS. 4A and 4B, or the like, will be used to convert the luminance dynamic range, of the data, which is defined by an absolute value into the luminance dynamic range at the time of printing. In this manner, the printing output can be adaptively changed in accordance with the presence/absence of the obtainment of the display information from the display apparatus 102.

In addition, it may be arranged so that the user can select, via the UI, whether the luminance dynamic range compression is to be performed by using the display information or is to be performed without using the display information. The intention of the user can be reflected by allowing the user to select whether the print output is a print output corresponding to the display of the display apparatus 102 or a print output based on HDR data.

The embodiments showed an example in which HDR data in compliance with the BT.2100 standard is to be displayed and printed. However, the present invention is not limited to the BT.2100 standard. Processing that is in compliance with another standard may be performed or only the transfer by OETF and EOTF may be performed. For example, although the HLG method and the PQ method have been exemplified as the transfer functions, another method may be used as long as a transfer function that processes the HDR data by defining the tone by the relative luminance value or the absolute luminance value is used. In such a case, the transfer functions and system gamma represented by equations (1) and (2) will be of a form that complies with the corresponding standard. In addition, for example, a piece of conversion information unique to the display such as a gamma value of gamma conversion processing, or the like, may be obtained as the display information.

Although FIGS. 4A and 4B, 5A and 5B, and 6 were exemplified as luminance dynamic range conversion methods according to the embodiments, the present invention is not limited to these methods. Any kind of method can be used as long as it is a method that performs conversion of the luminance dynamic range. In addition, the input/output luminance dynamic ranges of the dynamic range conversion processing are not limited to the luminance dynamic ranges (1,000 cd/m$^2$, and the like) exemplified in each embodiment. Furthermore, the display apparatus 102 according to the embodiments may be an apparatus of any form, and is not limited to the display as long as it is an apparatus that can display information such as a panel or a touch panel attached to a smartphone or an apparatus.

The present invention is not limited to the above embodiments, and various changes and modifications can be made within the spirit and scope of the present invention. Therefore, to apprise the public of the scope of the present invention, the following claims are made.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
at least one processor coupled to at least one memory that cause the image processing apparatus to function as:
(a) a first obtainment unit configured to obtain high-dynamic range (HDR) data that represents a high-dynamic range (HDR) image and has been obtained by using a transfer function;
(b) a second obtainment unit configured to obtain print information to perform printing based on the obtained HDR data;
(c) a third obtainment unit configured to obtain display information for a display apparatus in which a print preview is displayed, based on the obtained HDR data;
(d) a division unit configured to perform region division on a low-frequency component of the HDR image represented by the obtained HDR data; and
(e) a conversion unit configured to convert, by using a luminance range of the display apparatus indicated by the obtained display information, a dynamic range of luminance of the obtained HDR data into a first dynamic range by which the print preview is to be performed, and to convert, by using the obtained print information, the first dynamic range into a second dynamic range by which printing is to be performed, wherein the conversion unit performs the dynamic range conversion by using information for the dynamic range conversion that is set for the divided region.

2. The apparatus according to claim 1, wherein the display information includes dynamic range information of the display apparatus.

3. The apparatus according to claim 1, wherein the print information is information for specifying a dynamic range to be obtained by the conversion by the conversion unit.

4. The apparatus according to claim 3, wherein the print information includes information that indicates a type of a sheet to be printed.

5. The apparatus according to claim 1, wherein the conversion unit performs the dynamic range conversion by using information for the dynamic range conversion that corresponds to the display apparatus.

6. The apparatus according to claim 1, wherein the conversion unit converts the dynamic range of the luminance of the obtained HDR data into a dynamic range by which printing is to be performed so that input luminance and output luminance will match in a predetermined luminance range.

7. The apparatus according to claim 1 further comprising a correction unit configured to perform contrast correction on a high-frequency component of the HDR image represented by the HDR data.

8. The apparatus according to claim 1, further comprising a printing unit configured to perform printing based on data that has undergone dynamic range conversion by the conversion unit.

9. The apparatus according to claim 1, wherein the display apparatus is an HDR display.

10. The apparatus according to claim 1, wherein the display apparatus is an SDR display.

11. The apparatus according to claim 1, wherein the display apparatus is selected from a plurality of display apparatuses.

12. The apparatus according to claim 1, wherein the conversion unit determines whether or not the third obtainment unit can obtain the display information,
wherein, in a case when the conversion unit determines that the third obtainment unit cannot obtain the display information, the conversion unit does not perform the conversion of dynamic range using the display information and converts the dynamic range of luminance of the obtained HDR data into the second dynamic range by which printing is to be performed.

13. The apparatus according to claim 1, wherein the transfer function is an opto-electronic transfer function (OETF) of a hybrid log-gamma (HLG) method.

14. The apparatus according to claim 1, wherein the obtained display information indicates a maximum luminance and a minimum luminance that the display apparatus can display.

15. An image processing method to be executed in an image processing apparatus, the method comprising:
    obtaining high-dynamic range (HDR) data that represents a high-dynamic range (HDR) image and has been obtained by using a transfer function;
    obtaining print information to perform printing based on the obtained HDR data;
    obtaining display information for a display apparatus in which a print preview is displayed, based on the obtained HDR data;
    performing region division on a low-frequency component of the HDR image represented by the obtained HDR data;
    converting, by using a luminance range of the display apparatus indicated by the obtained display information, a dynamic range of luminance of the obtained HDR data into a first dynamic range by which the print preview is to be performed; and
    converting, by using the obtained print information, the first dynamic range into a second dynamic range by which printing is to be performed,
    wherein the dynamic range conversion is performed by using information for the dynamic range conversion that is set for the divided region.

16. A non-transitory computer-readable storage medium storing a program to cause a computer to function:
    to obtain high-dynamic range (HDR) data that represents a high-dynamic range (HDR) image and has been obtained by using a transfer function;
    to obtain print information to perform printing based on the obtained HDR data;
    to obtain display information for a display apparatus in which a print preview is displayed based on the HDR data;
    to perform region division on a low-frequency component of the HDR image represented by the obtained HDR data;
    to convert, by using a luminance range of the display apparatus indicated by the obtained display information, a dynamic range of luminance of the obtained HDR data into a first dynamic range by which the print preview is to be performed; and
    to convert, by using the obtained print information, the first dynamic range into a second dynamic range by which printing is to be performed,
    wherein the dynamic range conversion is performed by using information for the dynamic range conversion that is set for the divided region.

* * * * *